O. A. RIXFORD.
TIRE TREAD ATTACHMENT.
APPLICATION FILED FEB. 14, 1910.
978,210.
Patented Dec. 13, 1910.
2 SHEETS—SHEET 1.
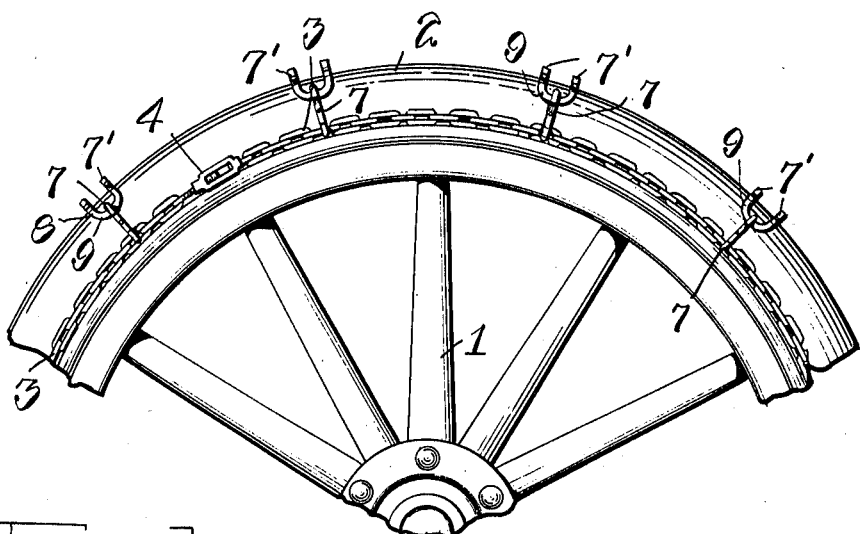
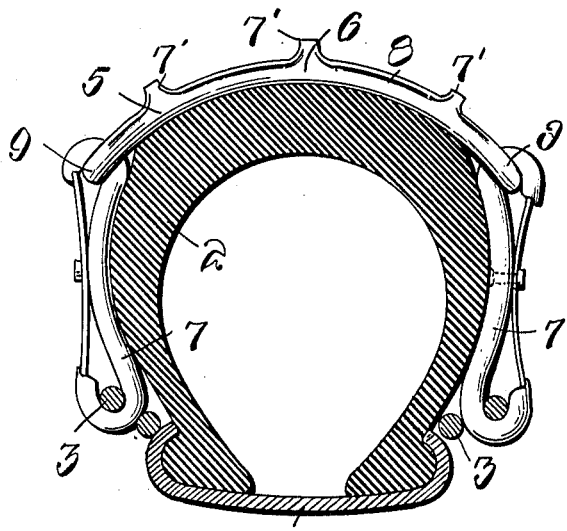
Witnesses
Chas. R. Griesbauer.
E. M. Ricketts
Inventor
O. A. Rixford,
By Watson E. Coleman.
Attorney O. A. RIXFORD.
TIRE TREAD ATTACHMENT.
APPLICATION FILED FEB. 14, 1910.
978,210.
Patented Dec. 13, 1910.
2 SHEETS—SHEET 2.
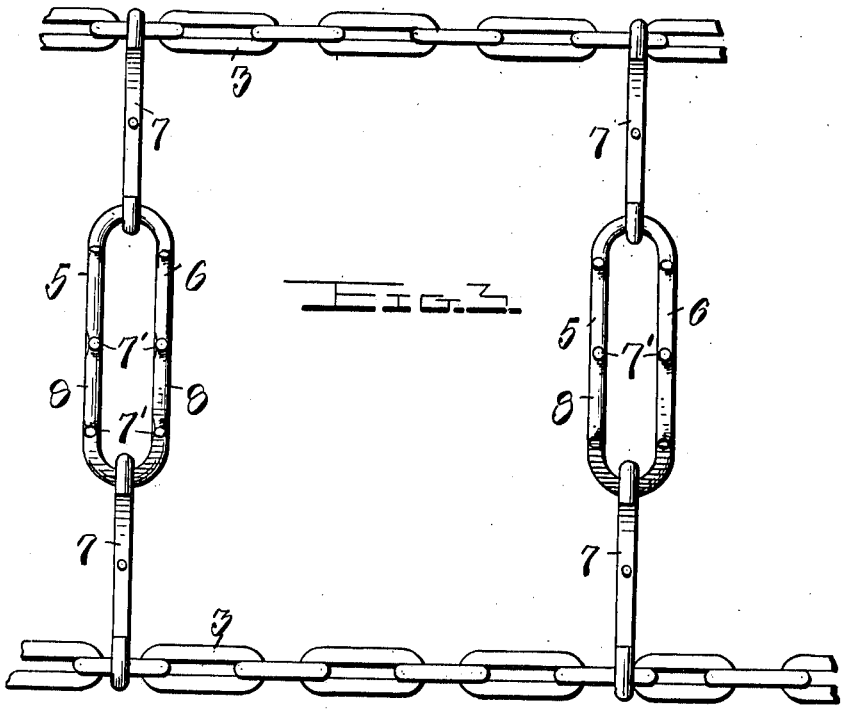
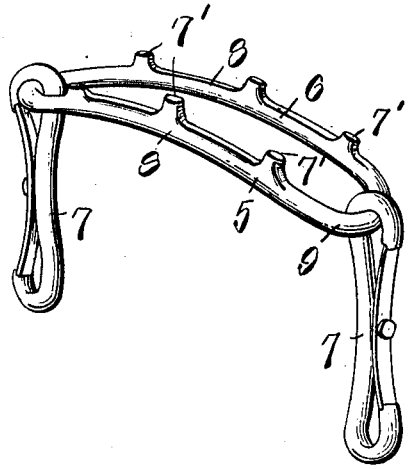
Witnesses
Chas. L. Griestauer.
E. M. Ricketts
Inventor
O. A. Rixford,
By Watson E. Coleman
Attorney

UNITED STATES PATENT OFFICE.

OSCAR A. RIXFORD, OF EAST HIGHGATE, VERMONT.

TIRE-TREAD ATTACHMENT.

978,210.

Specification of Letters Patent. Patented Dec. 13, 1910.

Application filed February 14, 1910. Serial No. 543,675.

*To all whom it may concern:*

Be it known that I, OSCAR A. RIXFORD, a citizen of the United States, residing at East Highgate, in the county of Franklin and State of Vermont, have invented certain new and useful Improvements in Tire-Tread Attachments, of which the following is a specification, reference being had to the accompanying drawings.

My invention relates to improvements in tire tread attachments and more particularly to one adapted to be used upon a pneumatic or elastic tire for preventing the wheel from slipping or skidding both laterally and longitudinally of the road.

The object of the invention is to provide a simple and practical anti-skid attachment of this character which will not injure the tire, which will be light and inexpensive in construction but at the same time sufficiently strong and durable to accomplish the purpose intended, and in which the tread links or shoes may be readily replaced when worn out.

With the above and other objects in view, the invention consists of the novel construction, combination and arrangement of parts, hereinafter fully described and claimed, and illustrated in the accompanying drawings in which:—

Figure 1 is a side elevation of a portion of a wheel showing the application of my improved anti-skid tread attachment to the tire thereof; Fig. 2 is a transverse section through the tire and wheel rim; Fig. 3 is a view of a portion of the attachment stretched out in a plane; and Fig. 4 is a perspective view of one of the cross members.

Referring more particularly to the drawings 1 denotes a portion of a wheel of an automobile or other vehicle and 2 denotes its pneumatic or elastic tire.

My improved anti-skid tire attachment consists of two flexible side members 3 which are preferably chains and the ends of which are preferably detachably and adjustably united by turn buckles 4. The attachment also comprises a plurality of independent cross members 5 arranged at intervals between the side members or chains and extending transversely across the tread portion of the tire 2, the side members extending around the opposite sides of the tire as usual. Each of the cross members 5 consists of a central tread link or shoe 6 and two connecting links 7, which latter flexibly unite the ends of the shoe to the side members. The tread link or shoe 6 is curved longitudinally for engagement with the curved tread portion of the tire 2 and it is preferably provided with studs or spurs 7 to prevent slipping or skidding. Said tread link or shoe is also preferably formed from a single metal rod shaped to provide a loop having parallel side portions or bars 8 united by curved or U-shaped ends 9. The studs 7 are formed or provided upon the bars 8, which latter are curved longitudinally, and the connecting links 7 are engaged with the curved ends 9 of the loop or link. These connecting links 7 are preferably in the form of double snap hooks, one end of each of which engages a link of one of the side chains 3, the other end of which engages an end of one of the tread links or loops. The use of double snap hooks to unite the tread links or shoes to the chains 3 permit the former to be quickly removed when worn and replaced by new ones, without removing the attachment from the wheel.

From the foregoing it will be seen that my invention provides an exceedingly simple and inexpensive attachment of this character, the parts of which are so constructed that they will not injure the tire in any way and may be readily disconnected and assembled. The detachable connection of the several parts permits one or more parts to be readily replaced when worn, and also permits the cross members to be increased or decreased in number to position them at any desired distance apart around the tread of the tire. The open construction of the tread links and the provision of the studs or spurs thereon effectively prevents slipping of the wheel either laterally or longitudinally of the road.

Having thus described the invention, what is claimed is:

The herein described tread attachment for tires, comprising side chains having their ends adjustably connected and cross members arranged between the side chains at intervals and each consisting of a pair of double snap hooks and a one-piece tread shoe, the latter being in the form of an elongated link provided with parallel side bars formed on their outer faces with integral studs, said side bars of the link being curved longitudinally and united by U-shaped ends, the latter being engaged by the outer ends of the two snap hooks, and the inner ends of said snap hooks being engaged with the links of the side chains as and for the purpose set forth.

In testimony whereof I hereunto affix my signature in the presence of two witnesses.

OSCAR A. RIXFORD.

Witnesses:
O. S. RIXFORD,
O. H. RIXFORD.